Nov. 23, 1948.  W. E. STEELE  2,454,353
DETACHABLE BLADE SCALPEL
Filed June 4, 1946
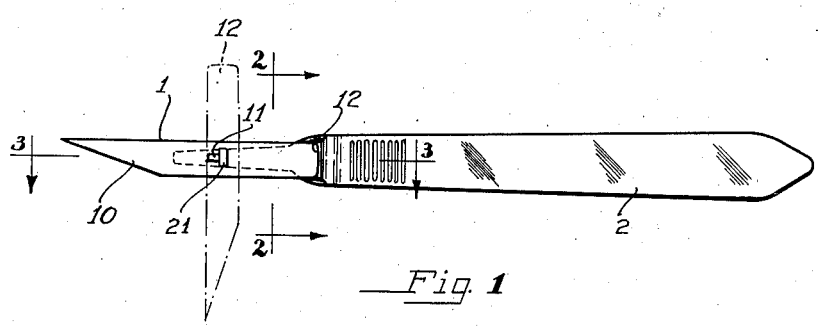
Fig. 1
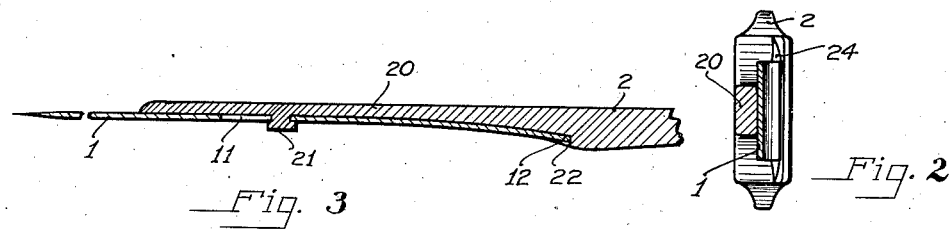
Fig. 3
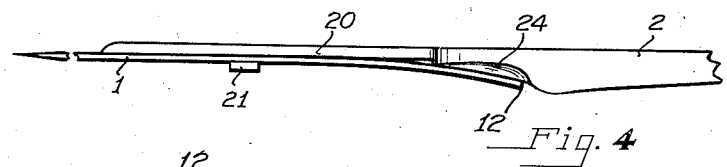
Fig. 2
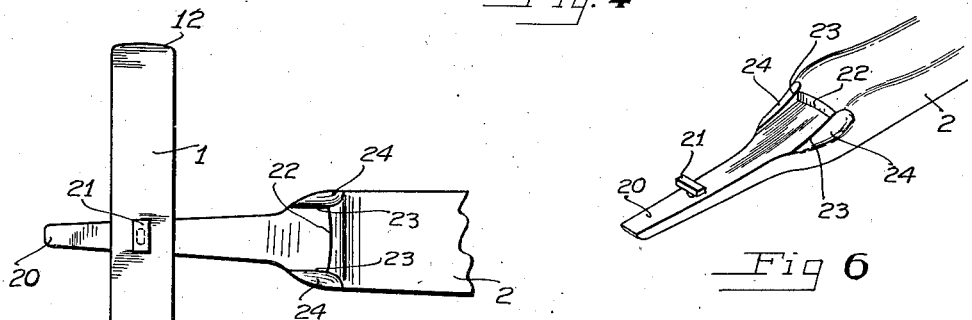
Fig. 4
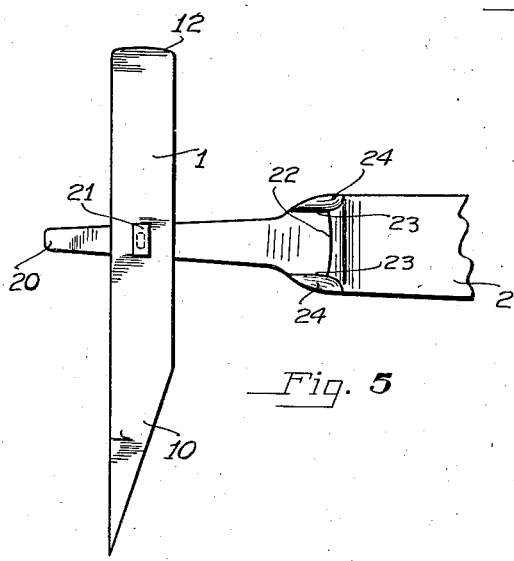
Fig. 5
Fig. 6
INVENTOR
WILLIAM E. STEELE
BY Reynolds & Beach
ATTORNEYS Patented Nov. 23, 1948

2,454,353

UNITED STATES PATENT OFFICE 2,454,353

DETACHABLE BLADE SCALPEL

William E. Steele, Seattle, Wash.

Application June 4, 1946, Serial No. 674,209

4 Claims. (Cl. 30—339)

My invention relates to scalpels of the type having detachable blades, and more particularly to an arrangement for connecting and securing together a removable scalpel blade and a suitable handle.

It is desirable that the blade of a scalpel be removable, because it is preferred that the scalpel handle be of light material, such as aluminum, while the blade must necessarily be of fine steel. To make the handle of a grade of steel similar to that required for the blade would involve unnecessary expense.

Moreover, scalpel blades are thin and may be broken rather easily, and if they are replaceable on a handle the expense of supplying a new handle is avoided. Also, because these blades must have a keen edge, it may be preferable to discard them for new blades at frequent intervals, instead of resharpening them.

If the blade of the scalpel is removable, it may be sterilized in a smaller space. For different types of surgery it is desirable to use blades having cutting points or edges of different shape. If the blades are removable, a blade of one shape may be substituted for a blade of a different shape without another handle being required for each.

Such advantages of scalpels having detachable blades have largely been offset in the past by the disadvantages of the type of mounting for the blade on the handle. It has been difficult to secure the blade to the handle, or, when the blade has been connected to the handle its removal has been too difficult, or the blade has been subject to accidental displacement relative to the handle during use.

It is a principal object of my invention, therefore, to provide an arrangement for attaching a scalpel blade to a handle in a manner such that the blade can be assembled with the handle easily and quickly, which will hold the blade firmly relative to the handle when the two have been thus assembled, and which will permit removal of the blade readily from the handle.

A further advantage of my blade mounting is its simplicity, so that it may be constructed economically, and its lack of moving parts, so that it will not get out of order.

When the blade has been assembled with the handle it is held securely both against inadvertent removal from the handle and against looseness or shifting relative to the handle.

Other advantages of my blade-attaching structure will be recognized in the illustrations of the drawings and following description. It will be understood, however, that the principles of my blade-attaching mechanism may be embodied in constructions differing considerably from the preferred form shown.

Figure 1 is a plan view of a scalpel, showing a detachable blade and handle secured together by representative blade-attaching structure according to my invention.

Figure 2 is a transverse sectional view through the scalpel of Figure 1, taken on line 2—2 of that figure, and Figure 3 is a longitudinal sectional view on line 3—3 of Figure 1.

Figure 4 is a side elevational view of a portion of the scalpel showing the blade in a position assumed during the process of attaching it to the handle.

Figure 5 is a plan view of a portion of the scalpel showing the blade in a position assumed during the process of attaching it to the handle, but differing from the position of the blade shown in Figure 4.

Figure 6 is a fragmentary top perspective view of the end of the scalpel handle adapted for attachment of my removable blade.

The blade 1 may have a point or cutting edge 10 of any suitable contour. The blade itself is a thin strip of high-grade steel. Its profile may be of substantially rectangular shape, except for the portion constituting the cutting edge, which may be any of a variety of usual or desired shapes.

The most notable characteristic of my blade-attaching arrangement is the use of two blade securing means spaced apart lengthwise of the handle and of the blade, each of which limits movement of its portion of the blade laterally of the handle in both directions parallel to the general plane of the blade, i. e. edgewise, and which cooperate to limit movement of the blade relative to the handle in a direction lengthwise of the blade. The features of the blade 1 constituting part of the spaced blade securing means of my attaching structure, are the aperture 11, located generally centrally of the blade, and the blade's butt end 12, remote from the cutting point or edge of the blade, curved substantially on the arc of a circle having its center in the aperture 11.

The handle 2 is shown as being of conventional shape, except for the end which carries the blade 1. From this end projects a tongue 20, extending lengthwise parallel to the handle, but considerably thinner than the adjacent end of the handle. One side of such tongue lies generally in continuation of one face of the handle, and the other side is adjacent to the longitudinal median plane of the handle. Consequently this tongue is disposed eccentrically of, or offset from such median plane of the handle. Intermediate the ends of tongue 20, and preferably substantially closer to its tip than to its root, is the handle element of the forward blade securing means in the form of a pin 21 projecting laterally from the side of the tongue which is closer to the median plane of the handle. This pin preferably has a head elongated transversely of the tongue. Conveniently such head may be of rectangular shape, as shown in the drawings, but it may be of other shapes, as described hereafter. As shown, the width of the pin's stem beneath its head in a direction transversely of the handle may be slightly less than, or at least not exceed, the width of the head of such pin in a direction lengthwise of tongue 20.

Whatever may be the shape or size of the head of pin 21 it should be complemental to the shape and size of the blade aperture 11, so that such aperture will pass readily over the head of the pin, as illustrated in Figure 5. It is preferred that the greatest dimension across the elongated blade aperture 11 extend lengthwise of the blade, and while the head of pin 21 is shown disposed on the handle tongue 20 in an attitude such that the blade must be held substantially perpendicular to the tongue to pass the blade aperture over the head of the pin, as shown in Figure 5, such arrangement is not essential. Thus the greater width of the pin head may extend in any direction generally transversely of tongue 20, if the greatest width of the blade aperture extends lengthwise of the blade. In an event the arrangement of the handle pin head and the blade aperture should be such that the blade will be disposed at a substantial angle to the handle 2, referred to herein as transversely of the handle, when the blade aperture is passed over the pin head.

As a matter of fact it is not necessary that the greatest width of the head of pin 21 extend in a direction transversely of the tongue, or even that it be elongated, although such construction as shown in the drawings and as described above is preferred. Thus the pin head might, for example, be circular, although appreciably greater in diameter than its stem, or even square. The essential feature is that the head of the pin be larger than its stem and the aperture 11 of the blade be capable of passing over the head of the pin and thereafter engage the stem, when the blade extends lengthwise of the handle, in a manner to hold the blade in face-to-face contact with the tongue. This action of the enlarged head of pin 21 when the aperture 11 is engaged with the stem of such pin, is illustrated clearly in Figure 3. Alternatively the headed pin, or equivalent projection, could be carried by the blade to fit in a complemental aperture or recess in the handle.

When the blade is held in face-to-face contact with the forward blade securing means, the rearward blade securing means holds the blade against sliding movement relative to the tongue while thus contacting it, so that the forward blade securing means may not be released inadvertently. Such rearward blade securing means thus retains blade aperture 11 in its holding engagement with the head of pin 21. This means should be such as to prevent inadvertent release of the pin from its socket even though the blade be stressed in a direction tending to press it against the under side of the pin head and away from contact with the surface of tongue 20. As a matter of fact, it is preferred that the blade be held in curved or bent condition to maintain it under stress to assist in retaining it firmly in position on the handle.

The rearward blade securing means includes a depression or socket in the handle for the end 12 of the blade remote from its cutting end. The face of tongue 20 closer to the median plane of the blade at its root is depressed below the corresponding surface of the handle to form a shoulder 22, against which the blade end 12 may abut. At each end of this shoulder is a rib 23 upstanding from the handle above the same face of the tongue, which form with the shoulder 22 a cavity or a depression, adapted to receive the blade end. The adjacent walls of ribs 23 preferably are sheer, and are spaced apart just sufficiently to receive the end of the blade snugly between them, constituting side blade restraining means.

If the head of pin 21 and the blade aperture 11 were of permissible shape, or if other suitable forward blade securing means were employed, it might be possible to slip the blade aperture over the pin head, or otherwise to engage the forward blade securing means, while the blade is disposed parallel to the handle. The blade may then be slid lengthwise forward until the edge of its aperture engages beneath the head of the pin, as shown in Figure 3, and the end 12 of the blade has snapped down into the cavity formed by shoulder 22 and ribs 23. Preferably, however, the forward blade securing means, such as the head of pin 21 and the cooperating blade aperture 11, are formed so that it will be necessary to engage the blade aperture with the pin head, or effect the corresponding engagement, while the blade is disposed generally transversely of the handle and tongue 20. In that case it will be necessary to swing the blade relative to the handle in order to engage its end 12 in the depression or socket between shoulder 22 and ribs 23.

In order to insure that the blade will be held firmly at all times and that its butt end 12 will be retained securely in its socket of the handle between the ribs 23, the head of pin 21 is arranged so that, for the edge of blade aperture 11 to engage beneath such head when the blade is parallel to the handle, the blade must be bent, as shown in Figure 4. To facilitate this bending action the outer surfaces 24 of ribs 23 are inclined downwardly and outwardly to form wedging surfaces for engagement by the blade end 12. In whichever direction the blade is swung, therefore, from a position such as shown in Figure 5 toward its attached or anchored position, the blade end will first engage a surface 24, and, as the blade continues to be swung toward alignment with the handle, such end will ride up an inclined surface 24 into the position shown in Figure 4. The wedging action thus produced will bend the blade as shown, so that, as its end passes beyond the rib over which it thus rides, it will snap down into the socket or depression at the root of the tongue 20.

It is important that in its anchored position the blade can not be displaced inadvertently in whatever direction pressure may be applied to its cutting tip. For that reason the end 12 of the blade is curved substantially on a radius about blade aperture 11, and likewise shoulder 22 on the handle preferably is curved complementally about pin 21 as a center. The distance between such handle shoulder and the adjacent side of the stem of pin 21 is equal to the length of the blade between the tip of blade end 12 and the adjacent edge of blade aperture 11. When the blade has been moved into anchored position, as shown in Figure 3, therefore, it cannot move forward by reason of the engagement of its aperture with pin 21, and it cannot move rearwardly because of the engagement of its end 12 with the handle shoulder 22, constituting end blade restraining means.

Since, as pointed out above, the spacing of ribs 23 is equal to the width of the end 12 of blade 1, this end of the blade cannot be displaced laterally of the handle parallel to the general plane of the blade in either direction, nor can it swing about pin 21. Moreover, the blade cannot be displaced laterally relative to the handle in either direction parallel to the general plane of the blade at such pin to any appreciable extent, because of the fit, which is at least reasonably close, between the sides of blade aperture 11 and the sides of the stem of pin 21. Thus the forward and rearward blade securing means cooperate to limit sliding of the blade relative to the handle in both directions lengthwise of the handle, when it is in attached position, generally parallel to the handle, while each of the forward and rearward blade securing means limits sliding of the blade relative to the handle in both directions laterally of the handle and parallel to the general plane of the blade at their respective locations.

In order to hold the blade firmly and to guard against its inadvertent escape from its socket effected by sidewise pressure in any direction on the cutting end of the blade, shoulder 22 is preferably of a height such that the surface of the tongue is somewhat concave, being curved toward the shoulder 22, as shown in Figure 3. The rise of this concave tongue portion, underlying and engaging the butt portion of blade 1 between such shoulder and pin 21 deflects the butt portion of the blade out of alignment with the portion of the blade at the opposite side of the pin, and maintains the blade continually in a bent, stressed condition, pressed against the under side of the pin head. With this blade thus stressed, inadvertent sliding of the blade relative to tongue 20 is discouraged, even though there should be slight clearance between the end 12 of the blade and the adjacent surfaces of ribs 23, or between the blade aperture 11 and the rearward side of the stem of pin 21, or between the blade end 12 and shoulder 22. Moreover, with the blade stressed in this curved fashion, its outer surface will be pressed firmly against the underside of the head of pin 21, even though the spacing between the underside of its head and the adjacent surface of tongue 20 may be somewhat greater than the thickness of the blade.

From the foregoing description, it is believed that the technique of attaching the blade to the handle and removing it from the handle will be apparent. First, the forward blade securing means are engaged, such as by passing blade aperture 11 over the head of pin 21, and then the rearward blade securing means are engaged, such as by engaging the end 12 of the blade in its socket. Where the structure shown in the drawing is utilized the blade aperture is engaged with pin 21 while the blade is directed transversely of the handle, and then the blade end 12 is swung toward the shoulder 22 of the handle, until such blade end engages and rides up the inclined surface 24 of a rib 23. Prior to engagement of its end 12 with such rib surface the blade should be pushed forward sufficiently so that, when it has been swung past the rib, the blade end will clear the handle shoulder 22, to enable such blade end to snap into the depression or socket provided at the root of tongue 20.

The blade may be removed easily from the handle by the reverse procedure of lifting its end 12 until it clears ribs 23. The blade may then be swung in either direction about pin 21 until its end 12 is clear of the handle, and the blade aperture 11 has been brought into proper registry with the head of pin 21 to enable the blade to be lifted off the pin.

I claim as my invention:

1. A detachable blade scalpel comprising a handle having a tongue projecting beyond one end thereof, a headed pin projecting laterally from said tongue at a location spaced a substantial distance from the root of said tongue, a blade having a cutting end, a butt end, and an aperture in said blade located intermediate its ends and of a size to pass over the head of said pin when in registry therewith and the blade and handle are pressed together, said handle having, adjacent to the root end of said tongue, an endwardly and transversely opening pocket, the side walls of which are separated a distance substantially equal to the width of the blade to retain the base end of said blade against appreciable lateral edgewise displacement, and the end wall of which pocket is located a distance from said pin lengthwise of the handle corresponding to the distance from the butt end of said blade to the blade aperture, to retain the said blade secured against endwise displacement in either direction, and the base of said pocket adjoining the root of said tongue being spaced upwardly from the general plane of the surface of said tongue contacting said blade, to spring said blade outwardly under stress and press the face thereof against the under side of the head of said pin.

2. The detachable blade scalpel defined in claim 1, in which both side edges of the blade near its butt end project appreciably beyond the respective sides of the tongue to provide a convenient hold on the blade for lifting the same from the pocket in the handle to detach such blade from the handle.

3. The detachable blade scalpel defined in claim 1, in which the pin's head is generally elongated transversely of the tongue, and the aperture in the blade is elongated lengthwise of the blade for a distance at least as great as such dimension of the pin's head transversely of the tongue, and the width of the blade's aperture does not appreciably exceed the width of the pin's head lengthwise of the tongue, the thickness of the pin's shank transversely of the tongue being slightly less than the width of the blade's aperture and appreciably less than the length of the pin's head transversely of the tongue.

4. A detachable blade scalpel comprising a scalpel blade having a cutting end, a butt end and an aperture located between the side edges of the blade and generally centrally between said blade ends, a handle having a headed pin projecting laterally therefrom near one end thereof, the head of such pin being of a size to pass through the aperture in said blade and of a width transversely of the handle greater than the width, transversely of the blade, of that portion of the blade aperture adjacent to the butt end of the blade, side blade restraining means on said handle disposed close alongside opposite edges of the butt portion of the blade, when the blade is disposed substantially parallel to the handle, to restrain appreciable edgewise swinging movement thereof about said pin, end blade restraining means on said handle engageable with the butt end of said blade to maintain said blade lengthwise with the edge of its aperture adjacent to the butt end of the blade substantially in engagement with the shank of said pin and with a portion of the blade adjacent to such aperture lodged beneath the head of said pin, and said handle having a raised portion spaced a substantial distance from said pin, underlying and engaging the butt portion of said blade and thereby springing such engaged blade portion under stress out of alignment with the portion of the blade at the opposite side of said pin and continually pressing the blade against the under side of the pin head.

WILLIAM E. STEELE.

REFERENCES CITED

The following references are of record in the file of this patent:

UNITED STATES PATENTS

| Number | Name | Date |
| --- | --- | --- |
| 445,237 | Yankauer | Jan. 27, 1891 |
| 1,448,305 | Langbein | Mar. 13, 1923 |
| 1,596,277 | Langbein | Aug. 17, 1926 |
| 1,706,712 | Sklar | Mar. 26, 1929 |

FOREIGN PATENTS

| Number | Country | Date |
| --- | --- | --- |
| 183,404 | Great Britain | July 27, 1922 |